United States Patent Office 3,256,335
Patented June 14, 1966

3,256,335
METHOD OF MAKING 5H-DIBENZO[a,d]
CYCLOHEPTEN-5-ONES
Harry L. Slates, Florham Park, and Norman L. Wendler, Summit, N.J., assignors to Merck & Co., Inc., Rahway, N.J., a corporation of New Jersey
No Drawing. Filed Jan. 16, 1964, Ser. No. 337,998
14 Claims. (Cl. 260—590)

This application is a continuation-in-part of our co-pending application Serial No. 196,478, filed May 21, 1962, now abandoned.

This invention relates to a method for the preparation of dibenzocyclohepten-5-ones. In particular, the invention relates to a method for preparing 5H-dibenzo[a,d]cy- clohepten-5-ones which are unsaturated at the 10,11-positions from the corresponding 10,11-saturated ketones. The invention also relates to the preparation of certain intermediates from which the above-mentioned compounds may be derived.

The process provided by the present invention for the preparation of the end compounds, namely, the 5H-dibenzo[a,d]cyclohepten-5-ones which are unsaturated at the 10,11-positions, comprises reacting a 10,11-dihydro-5H-dibenzo[a,d]cyclohepten-5-one with a phosphorus pentahalide to form a phosphorus pentahalide addition complex of the 10,11-unsaturated ketone and then hydrolyzing the complex so obtained to form the desired product. As is evident from the above, the essential feature of the invention is the introduction of a double bond between the 10 and 11 positions of the dibenzocycloheptenone nucleus. While the process is particularly suitable for the preparation of 5H-dibenzo[a,d]cyclohepten-5-one from 10,11-dihydro-5H-dibenzo[a,d]cyclohepten-5-one, it may be used with equal facility for the preparation of those ketones which may be substituted in the benzene moieties with one or more substituents from the appropriately substituted 10,11-saturated ketone providing such substituents will not react with the reagents utilized in the process. Thus, for example, the process may be used to prepare 10,11-dihydro-5H-dibenzo[a,d]cyclohepten-5-ones which are nuclearly substituted with one or more groups such as lower alkyl, lower alkoxy, lower alkenyl, halogen, haloloweralkoxy, cyano, loweralkoxycarbonyl, loweralkylmercapto, loweralkylsulfonyl, haloloweralkylsulfonyl diloweralkylsulfamyl and phenyl.

For purposes of illustration, the preparation of the compound 5H-dibenzo[a,d]cyclohepten-5-one from 10,11-dihydro-5H-dibenzo[a,d]cyclohepten - 5 - one employing phosphorus pentachloride, may be represented structurally as follows:

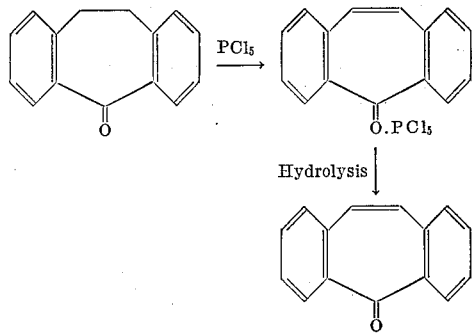

However, as previously indicated hereinabove, the above illustrated process may also be utilized for the preparation of 10,11-unsaturated dibenzocyclohepten-5-ones containing one or more substituents in the benzene moieties from the corresponding nuclearly substituted 10,11-saturated ketones employing either phosphorus pentachloride or phosphorus pentabromide.

As illustrated by the reaction scheme above, the first step of the process involves the reaction of the 10,11-dihydro ketone with phosphorus pentachloride (or phosphorus pentabromide) to form the phosphorus pentahalide addition complex of the 10,11-unsaturated ketone. The starting 10,11-dihydro ketones may be prepared as described in the examples or they may be prepared using the processes described in the J.A.C.S. 73, 1673–1678 (1951), Helv. Chem. Acta 36, 1489–1499 (1953), J. Org. Chem. 27, 230–240 (1962), British Patent No. 858,186, and elsewhere in the literature. The reaction with the phosphorus pentahalide is desirably carried out in the presence of a substantially anhydrous organic solvent such as benzene, toluene, xylene and the like and at elevated temperatures up to the reflux temperature of the mixture. However, the use of a solvent or the choice thereof are not critical features of the invention since a solvent need not be employed. If it is desired to employ a solvent, a suitable one can readily be ascertained by one skilled in the art. In carrying out this step of the reaction, care should be exercised to protect the reaction mixture from atmospheric moisture. Similarly, the temperature at which the reaction is carried out is not critical. While it is desirable to carry out the reaction at elevated temperatures, preferably reflux temperature, thereby minimizing exposure of the mixture to atmospheric moisture and hastening completion of the reaction, lower temperatures can be employed and the reaction time extended. While satisfactory yields of the desired complex are obtained following the above procedure, a further increase in yield can be obtained by carrying out the reaction in the presence of phosphorus oxychloride. The phosphorus pentahalide complex can be isolated using conventional techniques.

The second step of the process involves decomposition of the phosphorus pentahalide addition complex by hydrolysis. The hydrolysis may be effected using an aqueous medium. Water alone is sufficient, although it is desirable to employ an aqueous organic solvent medium such as a water-alcohol mixture to enhance the solubility of the complex thereby shortening the reaction time. The desired end product can be recovered using conventional techniques.

The ketones which may be prepared in accordance with this invention are useful for the preparation of various derivatives of dibenzocyclohetpenes. The compound 5H-dibenza[a,d]cyclohepten-5-one is employed as starting material for the preparation of cyproheptadine, a known therapeutic agent, as described in Example I of U.S. Patent No. 3,014,911. Numerous of the nuclearly substituted ketones are likewise useful as staring materials for the preparation of various other derivaties of dibenzocycloheptenes, such as are exemplified by U.S. Patent No. 3,014,911 and British Patent Nos. 858,186, 858,187 and 858,188.

The following examples are given for purposes of illustration and are not to be construed as limiting the invention.

EXAMPLE 1

5H-dibenzo[a,d]cyclohepten-5-one

To a solution of 25.0 g. of 5H-dibenzo[a,d]10,11-dihydrocyclohepten-5-one in 2.5 ml. phosphorus oxychloride and 50 ml. dry benzene is added 75 g. phosphorus pentachloride (3 eq.) and the mixture is stirred under reflux for 2.5 hours with protection from moisture. After ca. 15 minutes, a clear red solution results and a crystalline complex slowly separates accompanied by evolution of hydrogen chloride. At the end of the reflux period, the reaction mixture is chilled at 10° C. and the dark red complex is isolated by filtration and washed twice with 25 ml. of dry benzene. The red complex is decomposed by portionwise addition (highly exothermic reaction) to a vigorously stirred solution of 300 ml. of 5:1 methanol-water. The complex is added at such a rate as to maintain gentle ebullition. The aqueous methanol solution of the product is allowed to cool with stirring and is finally chilled to 10° C. The crystalline product is isolated by filtration, sucked dry on the filter, washed with 50 ml. of water, and air dried. The yield is 20.2 g. of 5H-dibenzo[a,d]cyclohepten - 5 - one; colorless needles, M.P. 84–86° (micro-hot stage). From the mother liquor there is obtained, after recrystallization from methanol, an additional 1.0 g. of the product; nearly colorless needles, 25 M.P. 82–85° (micro-hot stage). Total yield, 21.2 g. (85%).

EXAMPLE 2

*10,11-dihydro-3-dimethylsulfamoyl-5H-dibenzo[a,d]cyclohepten-5-one*

STEP A.—7-BROMO-3-FLUOROSULFONYL-10,11-DIHYDRO-5H-DIBENZO[a,d]CYCLOHEPTEN-5-ONE

Fluorosulfonic acid, 100 ml., is placed in a 300 ml. 3-necked round bottom flask equipped with polyethylene inlet tube and polyethylene exit tube with drying tube half-filled with anhydrous sodium fluoride. A nitrogen atmosphere is maintained throughout the reaction. With stirring, 17.0 g. (0.059 mole) of 3-bromo-10,11-dihydro-5H-dibenzo[a,d]cyclohepten-5-one is added in portions over 20 minutes. After stirring another 10 minutes, the dark green solution is heated on the steam-bath for 6½ hours. The mixture then is cooled to room temperature, poured cautiously with stirring into 1.5 kg. of crushed ice, and allowed to stand overnight at room temperature. The brown solid is collected, washed with water, dried in a vacuum desiccator over sodium hydroxide, and then extracted in a Soxhlet extractor with 700 ml. of boiling cyclohexane for 16 hours. On cooling, the cyclohexane extract deposits 11.65 g. (53%) of 7-bromo-3-fluorosulfonyl - 10,11 - dihydro-5H-dibenzo[a,d]cyclohepten-5-one as dark yellow flakes, M.P. 148–151° C. Recrystallizations from ether and cylohexane give an analytical sample, M.P. 150–152° C.

*Analysis.*—Calcd. for $C_{15}H_{10}O_3FBrS$: C, 48.79; H, 2.73; S, 8.69. Found: C, 48.78; H, 2.83; S, 8.87.

STEP B.—7-BROMO-10,11-DIHYDRO-3-DIMETHYLSULFAMOYL-5H-DIBENZO[a,d]CYCLOHEPTEN-5-ONE

7 - bromo - 10,11 - dihydro - 3 - fluorosulfonyl - 5H-dibenzo[a,d]cyclohepten-5-one (2.5 g., 0.00677 mole), together with 30 ml. of 25% aqueous dimethylamino and 30 ml. of p-dioxane is heated to refluxing for 3 hours. The brown solution is evaporated to dryness under reduced pressure and the residue partitioned between benzene and water. After washing with water, the benzene layer is evaporated to dryness under reduced pressure, leaving 7-bromo-10,11-dihydro-3-dimethylsulfamoyl-5H-dibenzo[a,d]cyclohepten-5-one as a tan solid, M.P. 142–145° C., in a yield of 2.1 g. (80%). An analytical sample melts at 146–148° C. after crystallizations from mixtures of benzene and hexane and from methanol.

*Analysis.*—Calcd. for $C_{17}H_{16}O_3NBrS$: C, 51.78; H, 4.09; N, 3.55. Found: C, 51.71; H, 4.12; N, 3.53.

STEP C.—10,11-DIHYDRO-3-DIMETHYLSULFAMOYL-5H-DIBENZO[a,d]CYCLOHEPTEN-5-ONE

7 - bromo - 10,11 - dihydro - 3 - dimethylsulfamoyl-5H-dibenzo[a,d]cyclohepten-5-one, 8.0 g. (0.0203 mole), is dissolved in a mixture of 100 ml. of absolute ethanol, 70 ml. of dimethylformamide and 5 ml. of triethylamine. The solution is hydrogenated at atmospheric pressure and in the presence of 600 mg. of 10% palladium on charcoal catalyst until hydrogen uptake is complete. Catalyst is removed by filtration and washed with absolute ethanol. The filtrate is evaporated to dryness under reduced pressure and the residue triturated with benzene. The insoluble triethylamine hydrobromide is filtered and the benzene filtrate evaporated to dryness under reduced pressure. Crystallization of the residual white solid from absolute ethanol affords 6.1 g. (97%) of 10,11-dihydro-3 - dimethylsulfamoyl - 5H - dibenzo[a,d]cyclohepten - 5-one, M.P. 122–124° C. The melting point is unchanged after crystallization from absolute ethanol.

*Analysis.*—Calcd. for $C_{17}H_{17}O_3NS$: C, 64.74; H, 5.44; N, 4.44. Found: C, 64.20; H, 5.47; N, 4.16.

EXAMPLE 3

*10,11-dihydro-3-methylsulfonyl-5H-dibenzo[a,d]cyclohepten-5-one*

STEP A.—PREPARATION OF CUPROUS METHYLMERCAPTIDE

Concentrated ammonium hydroxide solution, 300 ml., is placed in a 1 liter 3-necked flask fitted with a stirrer and gas inlet tube. The apparatus is cooled in an ice-bath and flushed with dry nitrogen while 40.0 g. (0.40 mole) of cuprous chloride is added portionwise with stirring. To the dark blue solution is added 95% ethanol, 300 ml., and then methylmercaptan is bubbled into the cooled solution until precipitation is complete and the supernatant solution becomes yellow. The solid is collected and washed by centrifugation with four portions of dilute ammonium hydroxide solution, followed by four portions of absolute ethanol. The yellow product is dried under reduced pressure at 45–50° C. and finally in a vacuum desiccator over concentrated sulfuric acid. The yield of product is 41.4 g. (93%).

STEP B.—PREPARATION OF 10–11-DIHYDRO-3-METHYLMERCAPTO-5H-DIBENZO[a,d]CYCLOHEPTEN-5-ONE

3 - bromo - 10,11 - dihydro - 5H - dibenzo[a,d]cyclohepten-5-one, 0.14 mole, and cuprous methylmercaptide, 0.18 mole, prepared as described in Step A, are put in a 100 ml. flask fitted with a stirrer and reflux condenser. Quinoline, 225 ml., and pyridine, 20 ml., are added and the slurry is heated at about 200° C. with stirring for 8 hours. The reaction mixture is poured into 6 N hydrochloric acid, 500 ml., and ice, and extracted with four 300 ml. portions of boiling benzene. The combined extracts are washed with three 500 ml. portions of 3 N hydrochloric acid. After washing with water, the solvent is evaporated under reduced pressure leaving a brown oil as residue. The residue is distilled under reduced pressure (0.01 mm.). The distillate solidifies and is recrystallized from 95% ethyl alcohol.

STEP C.—PREPARATION OF 10,11-DIHYDRO-3-METHYLSULFONYL-5H-DIBENZO[a,d]CYCLOHEPTEN-5-ONE 10,11 - dihydro - 3 - methylmercapto - 5H - dibenzo-[a,d]cyclohepten-5-one, 0.042 mole, is dissolved in 35 ml. of glacial acetic acid. Hydrogen peroxide (30%, 15 ml.) is added and the solution is stirred at room temperature for 65 hours. The desired product precipitates and is collected and dried. The product may be further purified by recrystallization.

We claim:
1. A method for making 5H-dibenzo[a,d]cyclohepten-5-ones from the corresponding 10,11-dihydro-5H-dibenzo-[a,d]cyclohepten-5-ones which comprises introducing a double bond between the 10 and 11 positions of said dihydro compound by reacting the latter with a phosphorus pentahalide having a halogen substituent of an atomic weight of at least 35 and no greater than 80 to form the phosphorus pentahalide addition complex of the corresponding 10,11-unsaturated ketone and thereafter hydrolyzing said complex in an aqueous medium.

2. The method of claim 1 wherein the reaction with the phosphorus pentahalide is carried out in a substantially anhydrous organic solvent.

3. The method of claim 1 wherein the reaction with the phosphorus pentahalide is carried out in a substantially anhydrous organic solvent and in the presence of phosphorus oxychloride.

4. The method of claim 2 wherein the phosphorus pentahalide is phosphorus pentachloride.

5. The method of claim 3 wherein the phosphorus pentahalide is phosphorus pentachloride.

6. A method of making 5H-dibenzo[a,d]cyclohepten-5-one from 5H-dibenzo[a,d]-10,11,-dihydrocyclohepten-5-one which comprises reacting said dihydro compound with a mixture of phosphorus pentachloride and phosphorus oxychloride in dry benzene under reflux to produce the phosphorus pentachloride addition complex of 5H-dibenzo[a,d]cyclohepten-5-one and thereafter hydrolyzing said complex in a methanol-water mixture to produce said product.

7. A method for the preparation of a phosphorus pentahalide addition complex of 5H-dibenzo[a,d]cyclohepten-5-ones from the corresponding 10,11-dihydro-5H-dibenzo[a,d]cyclohepten-5-ones which comprises treating the latter with a phosphorus pentahalide having a halogen substituent of an atomic weight of at least 35 and no greater than 80.

8. The method of claim 7 wherein the reaction with the phosphorus pentahalide is carried out in a substantially anhydrous organic solvent.

9. The method of claim 7 wherein the reaction with the phosphorus pentahalide is carried out in a substantially anhydrous organic solvent and in the presence of phosphorus oxychloride.

10. The method of claim 8 wherein the phosphorus pentahalide is phosphorus pentachloride.

11. The method of claim 9 wherein the phosphorus pentahalide is phosphorus pentachloride.

12. A phosphorus pentahalide addition complex of compounds of the formula

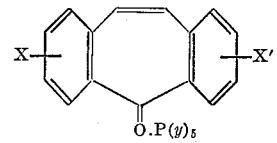

wherein X and X' are selected from the group consisting of lower alkyl, lower alkoxy, lower alkenyl, halogen, haloloweralkoxy, cyano, loweralkoxycarbonyl, loweralkylmercapto, loweralkylsulfonyl, haloloweralkylsufonyl, diloweralkylsulfamyl and phenyl; and $y$ is a halogen having an atomic weight of at least 35 and no greater than 80.

13. A phosphorus pentahalide addition complex of 5H-dibenzo[a,d]cyclohepten-5-one wherein the halogen substituent of said complex has an atomic weight of at least 35 and no greater than 80.

14. The phosphorus pentachloride addition complex of 5H-dibenzo[a,d]cyclohepten-5-one.

References Cited by the Examiner

UNITED STATES PATENTS 3,132,187   5/1964   Turetzsky _____ 260—668

OTHER REFERENCES

Cope et al.: J. Am. Chem. Soc. 73, 1673–1678 (1951).

LEON ZITVER, *Primary Examiner.*

DANIEL D. HORWITZ, *Examiner.*